United States Patent
Sanders et al.

(10) Patent No.: US 9,027,648 B2
(45) Date of Patent: May 12, 2015

(54) METHODS OF TREATING A SUBTERRANEAN FORMATION WITH ONE-STEP FURAN RESIN COMPOSITIONS

(71) Applicant: Halliburton Energy Services, Inc., Houston, TX (US)

(72) Inventors: Michael W. Sanders, Houston, TX (US); Philip D. Nguyen, Houston, TX (US)

(73) Assignee: Halliburton Engergy Services, Inc., Houston, TX (US)

( * ) Notice: Subject to any disclaimer, the term of this patent is extended or adjusted under 35 U.S.C. 154(b) by 201 days.

(21) Appl. No.: 13/845,502

(22) Filed: Mar. 18, 2013

(65) Prior Publication Data

US 2014/0262294 A1  Sep. 18, 2014

(51) Int. Cl.
*E21B 43/267* (2006.01)
*C09K 8/80* (2006.01)

(52) U.S. Cl.
CPC .............. *E21B 43/267* (2013.01); *C09K 8/805* (2013.01)

(58) Field of Classification Search
CPC ......... C09K 8/805; C09K 8/60; E21B 43/267
USPC .................... 166/259, 308.1, 308.2
See application file for complete search history.

(56) References Cited

U.S. PATENT DOCUMENTS

| | | | |
|---|---|---|---|
| 4,875,525 A | 10/1989 | Mana | |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,905,061 A | 5/1999 | Patel | |
| 5,977,031 A | 11/1999 | Patel | |
| 6,311,773 B1 | 11/2001 | Todd et al. | |
| 6,599,863 B1 | 7/2003 | Palmer et al. | |
| 6,668,926 B2 | 12/2003 | Nguyen et al. | |
| 6,828,279 B2 | 12/2004 | Patel et al. | |
| 6,887,834 B2 | 5/2005 | Nguyen et al. | |
| 6,962,200 B2 | 11/2005 | Nguyen et al. | |
| 7,013,976 B2 | 3/2006 | Nguyen et al. | |
| 7,059,406 B2 | 6/2006 | Nguyen | |
| 7,063,151 B2 * | 6/2006 | Nguyen et al. | 166/280.2 |
| 7,114,570 B2 | 10/2006 | Nguyen et al. | |
| 7,264,052 B2 | 9/2007 | Nguyen et al. | |
| 7,267,171 B2 | 9/2007 | Dusterhoft et al. | |
| 7,448,451 B2 | 11/2008 | Nguyen et al. | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 2003/0188872 A1 * | 10/2003 | Nguyen et al. | 166/308 |
| 2005/0006096 A1 | 1/2005 | Nguyen et al. | |
| 2005/0092489 A1 * | 5/2005 | Welton et al. | 166/280.2 |
| 2005/0257929 A1 | 11/2005 | Nguyen et al. | |
| 2010/0065271 A1 * | 3/2010 | McCrary et al. | 166/278 |
| 2014/0014338 A1 * | 1/2014 | Crews et al. | 166/280.1 |

FOREIGN PATENT DOCUMENTS

WO  2014151280 A1  9/2014

OTHER PUBLICATIONS

International Search Report and Written Opinion for PCT/US2014/025349 dated Aug. 13, 2014.

* cited by examiner

*Primary Examiner* — Zakiya W Bates
*Assistant Examiner* — Silvana Runyan
(74) *Attorney, Agent, or Firm* — McDermott Will & Emery LLP; Holly Soehnge

(57) ABSTRACT

Methods including providing at least one target interval in a wellbore, wherein the at least one target interval has a temperature of at least about 70° F. to at least about 290° F.; providing a pad fluid; providing a treatment fluid comprising proppant particulates coated with a one-step furan resin composition, wherein the one-step furan resin composition comprises a furan polymer, a hydrolyzable ester, a silane coupling agent, a surfactant, and a solvent; introducing the pad fluid into the wellbore at a rate and pressure sufficient to create or enhance at least one fracture within the target interval; introducing the treatment fluid into the wellbore so as to deposit the proppant particulates coated with the one-step furan resin composition into the at least one fracture; and setting the one-step furan resin composition so as to form at least a partially consolidated permeable proppant pack in the at least one fracture.

20 Claims, No Drawings

METHODS OF TREATING A SUBTERRANEAN FORMATION WITH ONE-STEP FURAN RESIN COMPOSITIONS

BACKGROUND

The present invention relates to methods of treating a subterranean formation with one-step furan resin compositions.

Hydrocarbon wells are often stimulated by hydraulic fracturing treatments. In hydraulic fracturing treatments, a viscous fracturing fluid, which also functions as a carrier fluid, is pumped into a portion of a subterranean formation at a rate and pressure such that the subterranean formation breaks down and one or more fractures are formed. Typically, particulate solids, such as graded sand, are suspended in a portion of the fracturing fluid and then deposited in the fractures. These particulate solids (generally referred to as "proppant" or "proppant particulates") are placed within the fractures and form proppant packs that serve to prevent the fractures from fully closing once the hydraulic pressure is removed. As used herein, the term "proppant pack" refers to a collection of proppant particulates within a fracture. The proppant pack contains interstitial spaces between individual proppant particulates that aid in forming conductive paths through which fluids may flow.

Often, hydraulic fracturing operations result in the creation of loose particles formed from the subterranean formation due to the creation of fractures. Moreover, some subterranean formations comprise loose particles notwithstanding any fracturing operation being performed, formations having naturally occurring loose particles may find them even more numerous after fracturing. Additionally, the proppant particulates placed within a fracture in a subterranean formation may become dislodged from a proppant pack and themselves become loose particles within the subterranean formation. These loose particles may make it difficult to recover fluids from the wellbore (i.e., oil and gas). The movement of the loose particles can create plugging of the proppant pack, thus requiring additional drawdown pressure to produce the well. As used herein, the term "drawdown pressure" refers to the differential pressure that drives fluids from within a wellbore to the surface.

One approach designed to prevent the movement of loose particles in a wellbore in a subterranean formation (or to "stabilize" or "consolidate") is the use of gravel packing or frac-packing techniques. As used herein, the term "gravel packing" refers to a particulate control method in which a permeable screen is placed in a wellbore in a subterranean formation and the annulus between the screen and the formation surface is packed with specially sized gravel or proppant particulates. The gravel or proppant particulates are designed to stop or filter loose particles (e.g., formation fines or particulates) from being produced with the formation fluids. The accumulation of particulates in the annulus is known in the art as a "gravel pack."

As used herein, the term "frac-packing" refers to a combined hydraulic fracturing and gravel packing treatment. In such frac-packing operations, a substantially particulate-free fluid is generally pumped through the annulus between a permeable screen and a wellbore in the subterranean formation and into perforations through a casing, or directly into the wellbore in the case of open hole completions, at a rate and pressure sufficient to create or enhance at least one fracture. Thereafter, a treatment fluid comprising particulates (e.g., gravel or proppant particulates) is pumped through the annulus between the permeable screen and the wellbore in the subterranean formation and into the perforations through a casing such that the particulates are placed within the at least one fracture, as well as in the annulus between the permeable screen and the wellbore in the subterranean formation, thus forming both a proppant pack in the fracture and a gravel pack in the annulus between the permeable screen and the wellbore.

In both gravel packing and frac-packing operations, loose particles may still escape the confines of the gravel pack and flow into the wellbore opening. This may be particularly true if the loose particles have a particularly variable size range with many small sized loose particles, such that the gravel pack is not capable of preventing the majority of loose particles from migrating through the pack.

Another technique for controlling the movement of loose particles in wellbores involves treating the formation (or proppant particulates) with a resin to facilitate consolidation of the loose particles within the formation and prevent them from migrating from the formation. However, consolidating agents are often difficult to handle, transport, and clean-up. For example, consolidating agents may cause damage to subterranean treatment equipment due to their inherent tendency to form a sticky or tacky surface. For this reason, furan resins, which do not pose the same handling problems because they are not internally catalyzed and which are cost-advantageous are often used. However, furan resins require an acid catalyst to help activate the polymerization of the resin in temperatures less than about 250° F. and typically require the addition of a corrosion inhibitor to protect iron and steel components in the wellbore from the acid. Corrosion inhibitors often lose their effectiveness at approximately 230° F. and must be carefully designed so as to function properly with the furan resin. Thus, while furan resins are beneficial in stabilizing loose particles in a wellbore in a subterranean formation, they are placed as a sequential fluid system and require specifically designed corrosion inhibitors that may not be operable at certain operational temperatures. Accordingly, an ongoing need exists for optimized furan resin treatments to stabilize loose particles in subterranean formations.

SUMMARY OF THE INVENTION

The present invention relates to methods of treating a subterranean formation with one-step furan resin compositions.

In some embodiments, the present invention provides a method comprising: providing at least one target interval in a wellbore in a subterranean formation, wherein the at least one target interval has a temperature in the range of at least about 70° F. to at least about 290° F.; providing a pad fluid; providing a treatment fluid comprising proppant particulates coated with a one-step furan resin composition, wherein the one-step furan resin composition comprises a furan polymer, a hydrolyzable ester, a silane coupling agent, a surfactant, and a solvent; introducing the pad fluid into the wellbore in the subterranean formation at a rate and pressure sufficient to create or enhance at least one fracture within the at least one target interval; introducing the treatment fluid into the wellbore in the subterranean formation so as to deposit the proppant particulates coated with the one-step furan resin composition into the at least one fracture; and setting the one-step furan resin composition so as to form at least a partially consolidated permeable proppant pack in the at least one fracture.

In other embodiments, the present invention provides a method comprising: providing at least one target interval in a wellbore in a subterranean formation, wherein the at least one target interval has a temperature in the range of at least about 70° F. to at least about 290° F.; positioning a permeable screen within the wellbore in the subterranean formation adjacent to the at least one target interval, so as to form an annulus between the permeable screen and the wellbore in the subterranean formation; providing a pad fluid; providing a treatment fluid comprising proppant particulates coated with a one-step furan resin composition, wherein the one-step furan resin composition comprises a furan polymer, a hydrolyzable ester, a silane coupling agent, a surfactant, and a solvent; introducing the pad fluid in the annulus between the permeable screen and the wellbore in the subterranean formation at a rate and pressure sufficient to create or enhance at least one fracture within the at least one target interval; introducing the treatment fluid into the wellbore in the subterranean formation so as to deposit the proppant particulates coated with the one-step furan resin composition into the at least one fracture and into the annulus between the permeable screen and the wellbore in the subterranean formation; and setting the one-step furan resin composition so as to form at least a partially consolidated permeable proppant pack in the at least one fracture and at least a partially consolidated gravel pack between the permeable screen and the wellbore in the subterranean formation.

In still other embodiments, the present invention provides a method comprising: providing at least one target interval in a wellbore in a subterranean formation having formation fines and pore throats there located, wherein the at least one target interval has a temperature in the range of at least about 70° F. to at least about 290° F.; providing a preflush fluid comprising a first brine base fluid and a first alkyl phosphonate cationic surfactant; providing a treatment fluid comprising a one-step furan resin composition comprising a furan polymer, a hydrolyzable ester, a silane coupling agent, a surfactant, and a solvent; providing an overflush fluid comprising a second brine base fluid and a second alkyl phosphonate cationic surfactant; introducing the preflush fluid into the wellbore in the subterranean formation so as to precondition a surface of the subterranean formation at the at least one target interval; introducing the treatment fluid into the wellbore in the subterranean formation so as to contact the one-step furan resin composition to the surface of the subterranean formation at the at least one target interval and at least partially coat the formation fines there located, and wherein introducing the treatment fluid into the wellbore in the subterranean formation causes the one-step furan resin to contact at least a portion of the pore throats there located; introducing the overflush fluid into the wellbore in the subterranean formation so as to displace an excess of the one-step furan resin from the pore throats; and setting the one-step furan resin composition so as to form at least a partially consolidated permeable formation fines pack at the at least one target interval.

The features and advantages of the present invention will be readily apparent to those skilled in the art upon a reading of the description of the preferred embodiments that follows.

DETAILED DESCRIPTION

The present invention relates to methods of treatment a subterranean formation with one-step furan resin compositions. More particularly, the present invention relates to methods of stabilizing subterranean formations during fracturing and frac-packing operations using a one-step furan resin composition.

The methods of the present invention do not require a sequential, stepwise placement for stabilizing a subterranean formation using a furan resin system. Rather, a single step may be employed using the methods of the present invention, simplifying process operations and personnel requirements, and increasing treatment efficiency.

In some embodiments, the present invention provides a method of treating at least one target interval in a wellbore in a subterranean formation having a temperature of at least about 70° F. and as high as 290° F. A pad fluid, particularly in the case of a fracturing treatment, is introduced into the wellbore in the subterranean formation at a rate and pressure sufficient to create or enhance at least one fracture within the at least one target interval. Thereafter, a treatment fluid comprising proppant particulates coated with a one-step furan resin composition is introduced into the wellbore in the subterranean formation so as to deposit the coated proppant particulates into the at least one fracture. The one-step furan resin composition comprises a furan polymer, a hydrolyzable ester, a silane coupling agent, a surfactant, and a solvent. The one-step furan resin composition is then set so as to form at least a partially consolidated permeable proppant pack in the at least one fracture. As used herein, the term "set" refers to any means that causes the furan resin of the present invention to at least partially cure into a tacky substance, such that it is somewhat sticky to the touch, and may include, for example, a catalytic reaction, a crosslinking reaction, and the like.

In other embodiments, the present invention provides a method of treating at least one target interval in a wellbore in a subterranean formation having a temperature of at least about 70° F. and as high as 290° F. A permeable screen is placed within the wellbore in the subterranean formation so as to form an annulus between the permeable screen and the wellbore in the subterranean formation. A pad fluid is introduced into the annulus between the permeable screen and the wellbore in the subterranean formation and through perforations in a casing, if applicable, at a rate and pressure sufficient to create or enhance at least one fracture within the at least one target interval. Thereafter, a treatment fluid comprising proppant particulates coated with a one-step furan resin composition is introduced into the annulus between the permeable screen and the wellbore in the subterranean formation so as to deposit the coated proppant particulates into the at least one fracture and into the annulus between the permeable screen and the wellbore in the subterranean formation. The one-step furan resin composition comprises a furan polymer, a hydrolyzable ester, a silane coupling agent, a surfactant, and a solvent. The one-furan resin composition is then set so as to form at least a partially consolidated permeable proppant pack in the at least one fracture and at least a partially consolidated gravel pack between the permeable screen and the wellbore in the subterranean formation.

The one-step furan resin composition of the present invention may comprise a furan polymer, a hydrolyzable ester, a silane coupling agent, a surfactant, and a solvent. The composition may be mixed to form a single component resin system which may be introduced downhole in a treatment fluid, which may be pre-coated onto the proppant particulates of the present invention, or which may be introduced downhole in a treatment fluid with proppant particulates that become coated as they traverse a wellbore in a subterranean formation. That is, the one-step furan resin of the present invention may be used to treat the formation matrix, to treat a gravel packed annulus, and/or to coat proppant particulates forming a proppant pack. In some embodiments, the one-step furan resin composition of the present invention may be present in the fluids of the present invention in an amount in the range of from about 0.1% to about 10% by weight of the fluid. In other embodiments, the one-step furan resin composition of the present invention may be present in the fluids of the present invention in an amount in the range of from about 1% to about 5% by weight of the fluid. In those embodiments where the one-step furan resin composition is coated onto proppant particulates, whether precoated or coated after introduction downhole, the one-step furan may be present in an amount in the range of from about 0.1% to about 10% by weight of the proppant particulates to be coated. In other embodiments where the one-step furan resin composition is coated onto proppant particulates, whether precoated or coated after introduction downhole, the one-step furan may be present in an amount in the range of from about 1% to about 5% by weight of the proppant particulates to be coated.

Suitable furan polymers for use in the one-step furan resin composition of the present invention include, but are not limited to, a furfural; a furfuryl alcohol; a reaction product of a furfuryl alcohol and an aldehyde; a reaction product of furfuryl alcohol and a phenol; a reaction product of a furfuryl alcohol and a keytone; and any combination thereof. In some embodiments, the furan polymer is present in the one-step furan resin composition in an amount in the range of from about 5% to about 95% by weight of the one-step furan resin. In other embodiments, the furan polymer is present in the one-step furan resin composition in an amount in the range of from about 20% to about 70% by weight of the one-step furan resin.

The hydrolyzable ester for use in the one-step furan resin composition of the present invention may be capable of releasing an acid catalyst that will react with the furan polymer to cure the resin. In some embodiments, the hydrolyzable ester may be encapsulated in a miscible compound (e.g., that does not interfere with the one-step property of the furan resin compositions of the present invention) such that the acid released by the hydrolyzable ester does not contact the furan polymer until the encapsulated compound is dissolved or ruptured, for example, by conditions of the subterranean formation (e.g., temperature, salinity, pH, and the like), hydrolysis, the elapse of time, or the presence of mechanical shear or stress. Suitable hydrolyzable esters for use in the one-step furan resins of the present invention include, but are not limited to, a formate ester; a diethylene glycol diformate; an ethyl lactate; a methyl lactate; a butyl lactate; an acetate ester; an ethylene glycol monoformate; a dimethylglutarate; a dimethyladipate; a dimethylsuccinate; a sorbitol; a catechol; a dimethylthiolate; a methyl salicylate; a dimethyl salicylate; a ter-butylhydroperoxide; any derivate thereof; and any combination thereof. In some embodiments, the hydrolyzable ester is present in the one-step furan resin compositions for use in the methods of the present invention in an amount in the range from about 0.1% to about 10% by weight of the furan polymer. In other embodiments, the hydrolyzable ester is present in the one-step furan resin compositions for use in the methods of the present invention in an amount in the range from about 1% to about 3% by weight of the furan polymer.

The one-step furan resin compositions of the present invention comprise a silane coupling agent. The silane coupling agent may be used, among other things, to act as a mediator to help bond the resin to formation particulates or proppant particulates. The silane coupling agents of the present invention contain the general formula: $(RO)_3SiCH_2CH_2CH_2$—X, where RO is a hydrolyzable group and X is an organofunctional group. Suitable examples of a hydrolyzable group R include, but are not limited to, an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof. Suitable examples of an organofunctional group X include, but are not limited to, an amino moiety; a methacryloxy moiety; an epoxy moiety; alkyl moiety; an ethyl moiety; a methyl moiety; a propyl moiety; a butyl moiety; a hexyl moiety; an octyl moiety; a benzyl moiety; a cyclohexyl moiety; and any combination thereof.

Specific examples of silane coupling agents that may be included in the one-step furan resin compositions of the present invention include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilane; aminoethyl-N-beta-(aminoethyl)-gamma-aminopropyl-trimethoxysilane; gamma-ureidopropyl-triethoxysilane; beta-(3-4 epoxy-cyclohexyl)-ethyl-trimethoxysilane; gamma-glycidoxypropyltrimethoxysilane; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltris(beta-methoxyethoxy) silane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-[3-(trimethoxysilyl)propyl]-ethylenediamine; and any combination thereof. In some embodiments, the silane coupling agent may be present in the one-step furan resin compositions of the present invention in an amount from about 0.01% to about 5% by weight of the composition. In other embodiments, the silane coupling agent may be present in the one-step furan resin compositions of the present invention in an amount from about 0.05% to about 3% by weight of the one-step furan resin composition. The silane coupling agent may be present in the one-step furan resin compositions of the present invention in an amount from about 0.05% to about 1% by weight of the one-step furan resin composition.

The one-step furan resin compositions of the present invention further comprises a surfactant. The surfactant may further aid to facilitate coating of the resin onto formation particulates and/or proppant particulates, and may work synergistically with the silane coupling agents of the present invention. The surfactant may also facilitate flow of the one-step furan resin composition between contact points within the wellbore in the subterranean formation. Any surfactant capable of facilitating the flow and the coating of the one-step furan resin composition onto formation particulates and/or proppant particulates may be used in the methods of the present invention. Suitable surfactants include, but are not limited to, an alkyl phosphonate surfactant (e.g., a C12-C22 alkyl phosphonate surfactant); an ethoxylated nonyl phenol phosphate ester; a cationic surfactants; a nonionic surfactants; and any combination thereof. Examples of such surfactant combinations are described in U.S. Pat. No. 6,311,773, the entire disclosure of which is incorporated herein by reference. The surfactant or surfactants that may be used are included in the one-step furan resin compositions of the present invention in an amount in the range of about 1% to about 10% by weight of the one-step furan resin composition.

A solvent is included in the one-step furan resin compositions of the present invention to control the viscosity of the one-step furan resin composition. Any solvent that is compatible with the other constituents of the one-step furan resin composition and that achieves the desired viscosity effect may be used in the methods of the present invention (e.g., glycol ether solvents). Suitable solvents may include, but are not limited to, butyl lactate; dipropylene glycol methyl ether; dipropylene glycol dimethyl ether; dimethyl formamide, diethylene glycol methyl ether; ethylene glycol butyl ether; diethylene glycol butyl ether; propylene carbonate; methanol; butyl alcohol; butyl acetate; furfuryl acetate; d' limonene; fatty acid methyl ester; butylglycidyl ether; isopropanol; diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof. Selection of an appropriate solvent is dependent on the one-step furan resin composition constituents chosen and is within the ability of one skilled in the art, with the benefit of this disclosure.

In some embodiments, the present invention provides a method of stabilizing a wellbore in a subterranean formation after an acidizing treatment, the formation having a target interval with a temperature of at least about 70° F. and formation fines and pore throats there located. As used herein, the term "pore throat" refers to a small pore space at the point where two grains meet, which connects two larger pore volumes. In those embodiments, a preflush fluid comprising a brine base fluid and an alkyl phosphonate cationic surfactant, preferably a C12-C22 alkyl phosphate cationic surfactant, is introduced into the wellbore in the subterranean formation so as to precondition a surface of the formation at the target interval. A treatment fluid comprising the one-step furan resin composition of the present invention is introduced into the wellbore in the subterranean formation so as to contact the one-step furan resin composition with the surface of the subterranean formation at the target interval and at least partially coat the formation fines there located. Additionally, the one-step furan resin composition contacts at least a portion of the pore throats there located. An overflush fluid comprising a brine base fluid and an alkyl phosphonate cationic surfactant, preferably a C12-C22 alkyl phosphate cationic surfactant, is introduced into the wellbore in the subterranean formation so as to displace an excess of the one-step furan resin from the pore throats. The one-step furan resin composition is desirably sufficiently coated on the formation fines, however, an excess of the one-step furan resin may enter into the pore spaces in the subterranean formation through which produced hydrocarbons should flow. If the excess one-step furan resin is not displaced, the composition will set and prevent or hinder hydrocarbon flow. Lastly, the one-step furan resin composition is set so as to form at least a partially consolidated permeable formation fines pack at the at least one target interval. As used herein, the term "formation fines pack" refers to the aggregation of one or more formation fines particles that have been consolidated or prevented from moving by interaction with the one-step furan resin composition of the present invention. In some embodiments, the step of introducing the preflush fluid, the treatment fluid, and the overflush fluid are repeated one or more times. Additionally, the one-step furan resin may be included in either or both of the preflush and overflush fluids in order to ensure maximum coating of the one-component furan resin composition onto the formation fines in the target interval in the formation.

In some embodiments, the present invention provides a method of stabilizing a wellbore in a subterranean formation after an acidizing treatment, the formation having a target interval with a temperature of at least about 70° F. and formation fines and pore throats there located. In those embodiments, a preflush fluid comprising a brine base fluid and an alkyl phosphonate cationic surfactant, preferably a C12-C22 alkyl phosphate cationic surfactant, is introduced into the wellbore in the subterranean formation at a rate and pressure so as to create or enhance at least one fracture within the at target interval and so as to precondition a surface of the formation at the target interval. A treatment fluid comprising proppant particulates and the one-step furan resin composition of the present invention is introduced into the wellbore in the subterranean formation so as to contact the one-step furan resin composition with the surface of the subterranean formation at the target interval and at least partially coat the formation fines there located and so as to coat the proppant particulates and place them within the at least one fracture, forming interstitial spaces therebetween the coated proppant particulates. Additionally, the one-step furan resin composition contacts at least a portion of the pore throats and a portion of the interstitial spaces. An overflush fluid comprising a brine base fluid and an alkyl phosphonate cationic surfactant, preferably a C12-C22 alkyl phosphate cationic surfactant, is introduced into the wellbore in the subterranean formation so as to displace an excess of the one-step furan resin from the pore throats and interstitial spaces. Lastly, the one-step furan resin composition is set so as to form at least a partially consolidated permeable formation fines pack at the at least one target interval and at least a partially consolidated permeable proppant pack in the at least one fracture.

While some embodiments of the present invention pertain to stabilizing subterranean formations having been fractured, frac-packed, or acidized, the methods of the present invention may be useful in any subterranean formation treatment that may benefit from the stabilizing one-step furan resin composition disclosed herein. Examples of such treatments include, but are not limited to, diagenesis protection and remedial proppant treatments, for example.

The treatment fluids and the pad fluids (collectively "fluids") of the present invention may be comprised of an aqueous base fluid; an aqueous-miscible base fluid; oil-based fluids; water-in-oil emulsions; oil-in-water emulsions; and any combination thereof. Suitable aqueous base fluids include, but are not limited to, fresh water; saltwater (e.g., water containing one or more salts dissolved therein); brine (e.g., saturated salt water); seawater; and any combination thereof. Generally, the water may be from any source, provided that it does not contain components that might adversely affect the stability and/or performance of the fluids of the present invention. Suitable aqueous-miscible base fluids may include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous fluid described above; any derivative thereof; and any combination thereof. Suitable oil-based fluids may include alkanes; olefins; aromatic organic compounds; cyclic alkanes; paraffins; diesel fluids; mineral oils; desulfurized hydrogenated kerosenes; and any combination thereof. Suitable water-in-oil emulsions, also known as invert emulsions, may have an oil-towater ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997; U.S. Pat. No. 5,977,031 entitled "Ester Based Invert Emulsion Drilling Fluids and Muds Having Negative Alkalinity" filed on Aug. 8, 1998; U.S. Pat. No. 6,828,279 entitled "Biodegradable Surfactant for Invert Emulsion Drilling Fluid" filed on Aug. 10, 2001; U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004; U.S. Pat. No. 7,645,723 entitled "Method of Drilling Using Invert Emulsion Drilling Fluids" filed on Aug. 15, 2007; and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

In certain embodiments, the viscosity of the aqueous base fluid or aqueous-miscible base fluid for use in the treatment fluids and/or pad fluids of the present invention can be adjusted, among other purposes, to provide additional particulate transport and suspension in the treatment fluids used in the methods of the present invention. In certain embodiments, the pH of the aqueous base fluid or aqueous-miscible base fluid may be adjusted (e.g., by a buffer or other pH adjusting agent), among other purposes, to adjust the viscosity of the fluids (e.g., activate a breaker, deactivate a crosslinking agent). In some embodiments, the pH range may preferably be from about 4 to about 11. One of ordinary skill in the art, with the benefit of this disclosure, will recognize when such pH adjustments are appropriate.

In certain embodiments, the fluids of the present invention may be foamed or gelled. Typically, the treatment fluid of the present invention and not the pad fluid will be foamed or gelled, but either may be. Foaming or gelling the fluids provides an increase in viscosity and/or suspendability of particulates (e.g., proppant particulates, additives, and the like). This may aid in ensuring that the proppant particulates reach the target interval without being lost to undesirable zones due to settling out of the fluid.

As used herein, the term "foam," in all its forms, refers to a two-phase composition having a continuous liquid phase and a discontinuous gas phase. In some embodiments, the fluids for use in conjunction with the present invention may comprise a gas and a foaming agent. Suitable gases for use in conjunction with the present invention may include, but are not limited to, nitrogen; carbon dioxide; air; methane; helium; argon; and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant particulate transport capability, up to about 12 lb of proppant per gallon of fracture fluid.

Suitable foaming agents for use in conjunction with the present invention may include, but are not limited to, a cationic foaming agent; an anionic foaming agent; an amphoteric foaming agents; a nonionic foaming agent; and any combination thereof. Nonlimiting examples of suitable foaming agents may include, but are not limited to, a betaine; a sulfated alkoxylate; a sulfonated alkoxylate; an alkyl quarternary amine; an alkoxylated linear alcohol; an alkyl sulfonate; an alkyl aryl sulfonate; a C10-C20 alkyldiphenyl ether sulfonate; a polyethylene glycol; an ether of alkylated phenol; a sodium dodecylsulfate; an alpha olefin sulfonate; a sodium dodecane sulfonate; a trimethyl hexadecyl ammonium bromide; any derivative thereof; and any combination thereof. Foaming agents may be included in foamed fluids of the present invention at concentrations ranging typically from about 0.05% to about 2% of the liquid component by weight (e.g., from about 0.5 to about 20 gallons per 1000 gallons of the liquid component).

In some embodiments, the quality of the foamed fluids for use in the methods of the present invention may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

The fluids of the present invention may be gelled with a gelling agent. The gelling agents suitable for use in the present invention may comprise any substance (e.g., a polymeric material) capable of increasing the viscosity of the fluids. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; and any combination thereof. The gelling agents also may be cationic gelling agents; anionic gelling agents; and any combination thereof. Suitable gelling agents include, but are not limited to, polysaccharides; biopolymers; and/or derivatives thereof that contain one or more of these monosaccharide units: galactose; mannose; glucoside; glucose; xylose; arabinose; fructose; glucuronic acid; pyranosyl sulfate; and any combination thereof. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and any combination thereof. In certain embodiments, the gelling agents comprise an organic carboxylated polymer, such as CMHPG.

Suitable synthetic polymers include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; a acrylamido-trialkyl ammonium salt; a methacrylamido-alkyl trialkyl ammonium salt; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyldimethyl-n-dodecylammonium chloride; methacrylamidopropyldimethyl-n-octylammonium chloride; methacrylamidopropyltrimethylammonium chloride; a methacryloylalkyltrialkyl ammonium salt; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the fluids useful in the methods of the present invention in an amount sufficient to provide the desired viscosity. In some embodiments, the gelling agents (i.e., the polymeric material) may be present in an amount in the range of from about 0.1% to about 10% by weight of the fluid. In certain embodiments, the gelling agents may be present in an amount in the range of from about 0.15% to about 2.5% by weight of the fluid.

In those embodiments of the present invention where it is desirable to crosslink the gelling agent, the pad fluids or the treatment fluids of the present invention may comprise one or more crosslinking agents. The crosslinking agents may comprise a borate ion; a metal ion; or similar component that is capable of crosslinking at least two molecules of the gelling agent. Examples of suitable crosslinking agents include, but are not limited to, borate ions; magnesium ions; zirconium IV ions; titanium IV ions; aluminum ions; antimony ions; chromium ions; iron ions; copper ions; magnesium ions; or zinc ions. These ions may be provided by providing any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combination thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art including, but not limited to the following: the type of gelling agent(s) included, the molecular weight of the gelling agent(s) included, the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the fluids useful in the methods of the present invention in an amount sufficient to provide the desired degree of crosslinking between molecules of the gelling agent. In certain embodiments, the crosslinking agent may be present in the fluids of the present invention in an amount in the range of from about 0.005% to about 1% by weight of the fluid. In certain embodiments, the crosslinking agent may be present in the fluids of the present invention in an amount in the range of from about 0.05% to about 1% by weight of the fluid. One of ordinary skill in the art, with the benefit of this disclosure, will recognize the appropriate amount of crosslinking agent to include in a treatment fluid of the present invention based on, among other things, the temperature conditions of a particular application, the type of gelling agent(s) used, the molecular weight of the gelling agent(s) used, the desired degree of viscosification, and/or the pH of the treatment fluid.

In those embodiments where the pad fluid and/or treatment fluid are gelled, the fluids may additionally comprise an internal gel breaker. The gel breakers may cause the gelled fluids of the present invention to revert to thin fluids that can be produced back to the surface, for example, after they have been used to place proppant particles in subterranean fractures or to carry other additives to desired locales. In some embodiments, the gel breaker may be formulated to remain inactive until it is "activated" by, among other things, certain conditions in the fluid (e.g., pH, temperature, etc.) and/or interaction with some other substance. In some embodiments, the gel breaker may be delayed by encapsulation with a coating (e.g., a porous coatings through which the breaker may diffuse slowly, or a degradable coating that degrades downhole) that delays the release of the gel breaker. In other embodiments, the gel breaker may be a degradable material (e.g., polylactic acid or polyglycolic acid) that releases an acid or alcohol in the presence of an aqueous liquid. In certain embodiments, the gel breaker used may be present in the pad fluid and/or treatment fluid of the present invention in an amount in the range of from about 0.0001% to about 200% by weight of the gelling agent. One of ordinary skill in the art, with the benefit of this disclosure, will recognize the type and amount of a gel breaker to include in certain treatment fluids of the present invention based on, among other factors, the desired amount of delay time before the gel breaks, the type of gelling agent(s) used, the temperature conditions of a particular application, the desired rate and degree of viscosity reduction, and/or the pH of the first treatment fluid and/or second treatment fluid.

The one-step furan resin composition of the present invention may be added to the treatment fluid of the present invention directly or may be coated onto proppant particulates for, among other reasons, to form a consolidated or a partially consolidated proppant pack and/or gravel pack. Suitable proppant particulates for use in the present invention may be of any size and shape combination known in the art suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series.

In some embodiments of the present invention, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cube-shaped, rectangul-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic, having sides about 0.08 inches in length. The use of substantially non-spherical proppant particulates may be desirable in some embodiments of the present invention because, among other things, they may provide a lower rate of settling in the treatment fluids of the present invention. The use of a combination of shapes of proppant particulates may be also desirable in some embodiments of the present invention because, among other things, the variety may allow aggregation of the individual proppant particulates so as to form a more permeable proppant pack or gravel pack.

Proppant particulates suitable for use in the present invention may comprise any material suitable for use in subterranean operations. Suitable materials for these proppant particulates include, but are not limited to, a sand; a bauxite; a ceramic material; a glass material; a polymer material (e.g., ethylene-vinyl acetate ("EVA") or composite materials); a polytetrafluoroethylene material; a nut shell piece; a cured resinous particulate comprising a nut shell piece; a seed shell piece; a cured resinous particulate comprising a seed shell piece; a fruit pit piece; a cured resinous particulate comprising a fruit pit piece; wood; a composite particulate; and any combination thereof. Suitable composite particulates may comprise a binder and a filler material, wherein suitable filler materials include, but are not limited to, silica; alumina; fumed carbon; carbon black; graphite; mica; titanium dioxide; barite; meta-silicate; calcium silicate; kaolin; talc; zirconia; boron; fly ash; a hollow glass microsphere; solid glass; and any combination thereof.

In some embodiments, a portion or all of the proppant particulates may be formed from degradable materials. Degradable proppant particulates may be particularly beneficial to ensure the permeability of a proppant pack or a gravel pack. That is, once a proppant pack or gravel pack is formed, the degradable proppant particulates may be degraded and removed so as to ensure interstitial spaces exist between individual proppant particulates to allow fluid flow. The use of degradable materials that may fill perforations in a casing prior to introducing treatment fluids comprising proppant particulates or gravel is not preferred. Such degradable materials may include, for example, calcium carbonate. In those embodiments, where degradable materials are used in the methods of the present invention, one of ordinary skill in the art, may preferably avoid coating the one-step furan resin onto the degradable materials, so as to ensure that they properly degrade.

In some embodiments the degradable material used to form proppant particulates is oil-degradable. For example, where such oil-degradable proppant particulates are used, in the event that fracture closure undesirably compacts the proppant particulates, thereby reducing the permeability of the proppant pack, the oil-degradable proppant particulates may be degraded by the produced fluids and restore at least some of the lost permeability. The degradable proppant particulates may also be degraded by materials purposely placed in the formation by injection, mixing the degradable particle with delayed reaction degradation agents, or other suitable means to induce degradation.

Any degradable proppant particulates are preferably substantially uniformly distributed throughout the at least partially consolidated proppant pack and/or gravel pack of the present invention. Over time, the degradable proppant particulates will degrade, in situ, and be substantially removed from the proppant pack and leave behind voids in the proppant pack. These voids enhance the porosity of the proppant pack, which may result, in situ, in enhanced conductivity.

Suitable degradable materials for use as proppant particulates of the present invention include oil-degradable polymers. Oil-degradable polymers that may be used in accordance with the present invention may be either natural or synthetic polymers. Some particular examples include, but are not limited to, polyacrylics; polyamides; polyolefins (e.g., polyethylene, polypropylene, polyisobutylene, and polystyrene); and any combination thereof. Other suitable oil-degradable polymers include those that have a melting point which is such that the polymer will melt or dissolve at the temperature of the subterranean formation in which it is placed, such as a wax material.

In addition to oil-degradable polymers, other degradable materials for use as proppant particulates of the present invention include, but are not limited to, degradable polymers; dehydrated salts; and any combination thereof. As for degradable polymers, a polymer is considered to be "degradable" herein if the degradation is due to, in situ, a chemical and/or radical process such as hydrolysis or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent, for example, on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., temperature, presence of moisture, oxygen, microorganisms, enzymes, pH, and the like).

It is desirable that the degradable proppant particulates have similar particle size, shape, and specific gravity as those of the non-degradable proppant particulates used, so as to enhance the distribution of degradable proppant particulates and minimize the segregation between the proppant particulate material types.

Suitable examples of degradable polymers that may be used to form degradable proppant particulates in accordance with the present invention include polysaccharides (e.g., dextran or cellulose); chitins; chitosans; proteins; aliphatic polyesters; poly(lactides); poly(glycolides); poly(ϵ-caprolactones); poly(hydroxybutyrates); polyanhydrides (e.g., poly(adipic anhydride), poly(maleic anhydride), poly(benzoic anhydride), poly(suberic anhydride), poly(sebacic anhydride), and poly(dodecanedioic anhydride)); aliphatic or aromatic polycarbonates; poly(orthoesters); poly(amino acids); poly(ethylene oxides); polyphosphazenes; and any combination thereof. Of these suitable polymers, aliphatic polyesters and polyanhydrides may be preferred.

Dehydrated salts may be used in accordance with the present invention as a degradable material forming the degradable proppant particulates. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax); anhydrous boric acid; and any combination thereof. These anhydrous borate materials are only slightly soluble in water. However, with time and heat in a subterranean environment, the anhydrous borate materials react with surrounding aqueous based fluids and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base may result in a neutral solution where this is desirable. Another example includes a blend of poly(lactic acid) and boric oxide. Other materials that undergo an irreversible degradation may also be suitable, if the products of the degradation do not undesirably interfere with the methods of the present invention.

In choosing the appropriate degradable material for use as the degradable proppant particulates of the present invention, one should consider the degradation products that will result. These degradation products should not adversely affect other operations or components and may even be selected to improve the long term performance/conductivity of the propped fracture. The choice of degradable material also can depend, at least in part, on the conditions of the well (e.g., well bore temperature). For instance, lactides have been found to be suitable for lower temperature wells, including those within the range of 60° F. to 150° F., and polylactides have been found to be suitable for well bore temperatures above this range. Some stereoisomers of poly(lactide) or mixtures of such stereoisomers may be suitable for even higher temperature applications. Dehydrated salts may also be suitable for higher temperature wells.

In some embodiments of the present invention, from about 10% to about 90% of the total proppant particulates used in the methods of the present invention are degradable. In other embodiments, from about 10% to about 70% of the total proppant particulates used in the methods of the present invention are degradable. In still other embodiments, from about 10% to about 50% of the total proppant particulates used in the methods of the present invention are degradable. One of ordinary skill in the art with the benefit of this disclosure will recognize an optimum concentration of degradable proppant particulates to use in the methods of the present invention to achieve the desired results.

Thus, some embodiments of the present invention provide:

(A) A method of treating at least one target interval in a wellbore in a subterranean formation having a temperature in the range of at least about 70° F. to at least about 290° F. First, a pad fluid is introduced into the wellbore at a rate and pressure sufficient to create or enhance at least one fracture within the at least one target interval. Thereafter, a treatment fluid comprising proppant particulates coated with a one-step furan resin composition is introduced into the wellbore so as to deposit the proppant particulates coated with the one-step furan resin composition into the at least one fracture. The one-step furan resin composition comprises a furan polymer, a hydrolyzable ester, a silane coupling agent, a surfactant, and a solvent. Finally, the one-step furan resin composition is set so as to form at least a partially consolidated permeable proppant pack in the at least one fracture.

(B) A method of treating at least one target interval in a wellbore in a subterranean formation having a temperature in the range of at least about 70° F. to at least about 290° F. A permeable screen is positioned within the wellbore adjacent to the at least one target interval, so as to form an annulus between the permeable screen and the wellbore. Next, a pad fluid is introduced into the wellbore at a rate and pressure sufficient to create or enhance at least one fracture within the at least one target interval. Thereafter, a treatment fluid comprising proppant particulates coated with a one-step furan resin composition is introduced into the wellbore so as to deposit the proppant particulates coated with the one-step furan resin composition into the at least one fracture and into the annulus between the permeable screen and the wellbore. The one-step furan resin composition comprises a furan polymer, a hydrolyzable ester, a silane coupling agent, a surfactant, and a solvent. Finally, the one-step furan resin composition is set so as to form at least a partially consolidated permeable proppant pack in the at least one fracture and at least a partially consolidated gravel pack between the permeable screen and the wellbore.

(C) A method of treating at least one target interval in a wellbore in a subterranean formation having a temperature in the range of at least about 70° F. to at least about 290° F. and having formation fines and pore throats there located. First, a preflush fluid comprising a brine base fluid and an alkyl phosphonate cationic surfactant is introduced into the wellbore so as to precondition a surface of the subterranean formation at the at least one target interval. Next a treatment fluid comprising a one-step furan resin composition comprising a furan polymer, a hydrolyzable ester, a silane coupling agent, a surfactant, and a solvent is introduced into the wellbore so as to contact the one-step furan resin composition to the surface of the subterranean formation at the at least one target interval and at least partially coat the formation fines there located and so as to contact at least a portion of the pore throats there located. Next, an overflush fluid comprising a second brine base fluid and an alkyl phosphonate cationic surfactant is introduced into the wellbore so as to displace an excess of the one-step furan resin from the pore throats. Finally, the one-step furan resin composition is set so as to form at least a partially consolidated permeable formation fines pack at the at least one target interval.

Each of embodiments A, B, and C (above) may have one or more of the following additional elements in any combination:

Element 1: A method wherein the treatment fluid is introduced into the wellbore in the subterranean formation at a rate and pressure sufficient to enhance the at least one fracture within the at least one target interval.

Element 2: A method wherein the treatment fluid comprises proppant particulates.

Element 3: A method wherein the treatment fluid comprises proppant particulates coated with the one-step furan resin composition.

Element 4: A method wherein at least a portion of the proppant particulates or the proppant particulates coated with the one-step furan resin composition are degradable.

Element 5: A method wherein the furan polymer is selected from the group consisting of a furfural; a furfuryl alcohol; a reaction product of a furfuryl alcohol and an aldehyde; a reaction product of furfuryl alcohol and a phenol; a reaction product of a furfuryl alcohol and a keytone; and any combination thereof.

Element 6: A method wherein the hydrolyzable ester is selected from the group consisting of a formate ester; a diethylene glycol diformate; an ethyl lactate; a methyl lactate; a butyl lactate; an acetate ester; an ethylene glycol monoformate; a dimethylglutarate; a dimethyladipate; a dimethylsuccinate; a sorbitol; a catechol; a dimethylthiolate; a methyl salicylate; a dimethyl salicylate; a ter-butylhydroperoxide; any derivate thereof; and any combination thereof.

Element 7: A method wherein the silane coupling agent comprises the formula: $(RO)_3SiCH_2CH_2CH_2$—X, where RO is a hydrolyzable group selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof, and where X is an organofunctional group selected from the group consisting of an amino moiety; a methacryloxy moiety; an epoxy moiety; alkyl moiety; an ethyl moiety; a methyl moiety; a propyl moiety; a butyl moiety; a hexyl moiety; an octyl moiety; a benzyl moiety; a cyclohexyl moiety; and any combination thereof.

Element 8: A method wherein the surfactant is selected from the group consisting of an alkyl phosphonate surfactant (e.g., a C12-C22 alkyl phosphonate surfactant); an ethoxylated nonyl phenol phosphate ester; a cationic surfactants; a nonionic surfactants; and any combination thereof.

Element 9: A method wherein the solvent is selected from the group consisting of butyl lactate; dipropylene glycol methyl ether; dipropylene glycol dimethyl ether; dimethyl formamide, diethylene glycol methyl ether; ethylene glycol butyl ether; diethylene glycol butyl ether; propylene carbonate; methanol; butyl alcohol; butyl acetate; furfuryl acetate; d' limonene; fatty acid methyl ester; butylglycidyl ether; isopropanol; diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof.

Element 10: A method wherein a preflush fluid comprising a brine base fluid and an alkyl phosphonate cationic surfactant is introduced into the wellbore prior to introducing the treatment fluid.

Element 11: A method wherein an overflush fluid comprising a brine base fluid and an alkyl phosphonate cationic surfactant is introduced into the wellbore after introducing the treatment fluid.

Element 12: A method wherein a preflush fluid comprising a first brine base fluid and a first alkyl phosphonate cationic surfactant is introduced prior to introducing the treatment fluid and an overflush fluid comprising a second brine base fluid and a second alkyl phosphonate cationic surfactant is introduced after introducing the treatment fluid.

While any of the above combinations are specifically contemplated herein, some non-limiting examples of suitable combinations include: A with 1 and 4; B with 1 and 3; B with 4, 7, and 11; and C with 3 and 4.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing at least one target interval in a wellbore in a subterranean formation,
wherein the at least one target interval has a temperature in the range of at least about 70° F. to at least about 290° F.;
providing a pad fluid;
providing a preflush fluid comprising a first brine base fluid, a first alkyl phosphonate cationic surfactant, and a first one-step furan resin composition,
providing a treatment fluid comprising proppant particulates coated with a second one-step furan resin composition,
wherein the first and second one-step furan resin composition comprise a furan polymer, a hydrolyzable ester, a silane coupling agent, a surfactant, and a solvent;
introducing the pad fluid into the wellbore in the subterranean formation at a rate and pressure sufficient to create or enhance at least one fracture within the at least one target interval;

introducing the preflush fluid into the wellbore in the subterranean formation so as to precondition a surface of the subterranean formation at the at least one target interval, and so as to contact the first one-step furan resin composition to the surface of the subterranean formation at the at least one target interval and at least partially coat formation fines there located;

introducing the treatment fluid into the wellbore in the subterranean formation so as to deposit the proppant particulates coated with the second one-step furan resin composition into the at least one fracture; and setting the second one-step furan resin composition coated onto the proppant particulates so as to form at least a partially consolidated permeable proppant pack in the at least one fracture.

2. The method of claim 1, wherein the treatment fluid is introduced into the wellbore in the subterranean formation at a rate and pressure sufficient to enhance the at least one fracture within the at least one target interval.

3. The method of claim 1, wherein at least a portion of the proppant particulates are degradable.

4. The method of claim 1, wherein the furan polymer is selected from the group consisting of a furfural; a furfuryl alcohol; a reaction product of a furfuryl alcohol and an aldehyde; a reaction product of furfuryl alcohol and a phenol; a reaction product of a furfuryl alcohol and a keytone; and any combination thereof.

5. The method of claim 1, wherein the hydrolyzable ester is selected from the group consisting of a formate ester; a diethylene glycol diformate; an ethyl lactate; a methyl lactate; a butyl lactate; an acetate ester; an ethylene glycol monoformate; a dimethylglutarate; a dimethyladipate; a dimethylsuccinate; a sorbitol; a catechol; a dimethylthiolate; a methyl salicylate; a dimethyl salicylate; a ter-butylhydroperoxide; any derivate thereof; and any combination thereof.

6. The method of claim 1, wherein the silane coupling agent comprises the formula: $(RO)_3SiCH_2CH_2CH_2-X$, where RO is a hydrolyzable group selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof, and where X is an organofunctional group selected from the group consisting of an amino moiety; a methacryloxy moiety; an epoxy moiety; alkyl moiety; an ethyl moiety; a methyl moiety; a propyl moiety; a butyl moiety; a hexyl moiety; an octyl moiety; a benzyl moiety; a cyclohexyl moiety; and any combination thereof.

7. The method of claim 1, wherein the surfactant is selected from the group consisting of an alkyl phosphonate surfactant; an ethoxylated nonyl phenol phosphate ester; a cationic surfactant; a nonionic surfactant; and any combination thereof.

8. The method of claim 1, wherein the solvent is selected from the group consisting of butyl lactate; dipropylene glycol methyl ether; dipropylene glycol dimethyl ether; dimethyl formamide, diethylene glycol methyl ether; ethylene glycol butyl ether; diethylene glycol butyl ether; propylene carbonate; methanol; butyl alcohol; butyl acetate; furfuryl acetate; d'limonene; fatty acid methyl ester; butylglycidyl ether; isopropanol; diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof.

9. A method comprising:
providing at least one target interval in a wellbore in a subterranean formation,
wherein the at least one target interval has a temperature in the range of at least about 70° F to at least about 290° F;
positioning a permeable screen within the wellbore in the subterranean formation adjacent to the at least one target interval, so as to form an annulus between the permeable screen and the wellbore in the subterranean formation;
providing a pad fluid;
providing a preflush fluid comprising a first brine base fluid, a first alkyl phosphonate cationic surfactant, and a first one-step furan resin composition,
providing a treatment fluid comprising proppant particulates coated with a second one-step furan resin composition,
wherein the first and second one-step furan resin composition comprise a furan polymer, a hydrolyzable ester, a silane coupling agent, a surfactant, and a solvent;
introducing the pad fluid in the annulus between the permeable screen and the wellbore in the subterranean formation at a rate and pressure sufficient to create or enhance at least one fracture within the at least one target interval;
introducing the preflush fluid into the wellbore in the subterranean formation so as to precondition a surface of the subterranean formation at the at least one target interval, and so as to contact the first one-step furan resin composition to the surface of the subterranean formation at the at least one target interval and at least partially coat formation fines there located;
introducing the treatment fluid into the wellbore in the subterranean formation so as to deposit the proppant particulates coated with the second one-step furan resin composition into the at least one fracture and into the annulus between the permeable screen and the wellbore in the subterranean formation; and
setting the second one-step furan resin composition coated onto the proppant particulates so as to form at least a partially consolidated permeable proppant pack in the at least one fracture and at least a partially consolidated gravel pack between the permeable screen and the wellbore in the subterranean formation.

10. The method of claim 9, wherein the treatment fluid is introduced into the wellbore in the subterranean formation at a rate and pressure sufficient to enhance the at least one fracture within the at least one target interval.

11. The method of claim 9, wherein at least a portion of the proppant particulates are degradable.

12. The method of claim 9, wherein the furan polymer is selected from the group consisting of a furfural; a furfuryl alcohol; a reaction product of a furfuryl alcohol and an aldehyde; a reaction product of furfuryl alcohol and a phenol; a reaction product of a furfuryl alcohol and a keytone; and any combination thereof.

13. The method of claim 9, wherein the hydrolyzable ester is selected from the group consisting of a formate ester; a diethylene glycol diformate; an ethyl lactate; a methyl lactate; a butyl lactate; an acetate ester; an ethylene glycol monoformate; a dimethylglutarate; a dimethyladipate; a dimethylsuccinate; a sorbitol; a catechol; a dimethylthiolate; a methyl salicylate; a dimethyl salicylate; a ter-butylhydroperoxide; any derivate thereof; and any combination thereof.

14. The method of claim 9, wherein the silane coupling agent comprises the formula: $(RO)_3SiCH_2CH_2CH_2-X$, where RO is a hydrolyzable group selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof, and where X is an organofunctional group selected from the group consisting of an amino moiety; a methacryloxy moiety; an epoxy moiety; alkyl moiety; an ethyl moiety; a methyl moiety; a propyl moiety; a butyl moiety; a hexyl moiety; an octyl moiety; a benzyl moiety; a cyclohexyl moiety; and any combination thereof.

15. The method of claim 9, wherein the surfactant is selected from the group consisting of an alkyl phosphonate surfactant; an ethoxylated nonyl phenol phosphate ester; a cationic surfactant; a nonionic surfactant; and any combination thereof.

16. The method of claim 9, wherein the solvent is selected from the group consisting of butyl lactate; dipropylene glycol methyl ether; dipropylene glycol dimethyl ether; dimethyl formamide, diethylene glycol methyl ether; ethylene glycol butyl ether; diethylene glycol butyl ether; propylene carbonate; methanol; butyl alcohol; butyl acetate; furfuryl acetate; d'limonene; fatty acid methyl ester; butylglycidyl ether; isopropanol; diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof.

17. A method comprising:
providing at least one target interval in a wellbore in a subterranean formation having formation fines and pore throats there located,
wherein the at least one target interval has a temperature in the range of at least about 70° F to at least about 290° F;
providing a preflush fluid comprising a first brine base fluid, a first alkyl phosphonate cationic surfactant, and a first one-step resin composition;
providing a treatment fluid comprising a second one-step furan resin,
wherein the first and second one-step furan resin composition comprise a furan polymer, a hydrolyzable ester, a silane coupling agent, a surfactant, and a solvent;
providing an overflush fluid comprising a second brine base fluid and a second alkyl phosphonate cationic surfactant;
introducing the preflush fluid into the wellbore in the subterranean formation so as to precondition a surface of the subterranean formation at the at least one target interval, and so as to contact the first one-step furan resin composition to the surface of the subterranean formation at the at least one target interval and at least partially coat formation fines there located;
introducing the treatment fluid into the wellbore in the subterranean formation so as to contact the second one-step furan resin composition to the surface of the subterranean formation at the at least one target interval and at least partially coat the formation fines there located, and
wherein introducing the preflush fluid and/or the treatment fluid into the wellbore in the subterranean formation causes the first and/or second one-step furan resin to contact at least a portion of the pore throats there located;
introducing the overflush fluid into the wellbore in the subterranean formation so as to displace an excess of the first and/or second one-step furan resin from the pore throats; and
setting the first and/or second one-step furan resin composition so as to form at least a partially consolidated permeable formation fines pack at the at least one target interval.

18. The method of claim 17, wherein the steps of introducing the preflush fluid, introducing the treatment fluid, and introducing the overflush fluid are repeated at least a second target interval.

19. The method of claim 17, wherein a third one-step furan resin composition is present in the overflush fluid.

20. The method of claim 17, wherein the step of introducing the preflush fluid in the wellbore in the subterranean formation is at a rate and pressure sufficient to create or enhance at least one fracture within the at least one target interval,
wherein the treatment fluid further comprises proppant particulates,
wherein the step of introducing the treatment fluid further comprises coating the second one-step furan resin composition onto at least a portion of the proppant particulates and depositing the proppant particulates coated with the second one-step furan resin composition into the at least one fracture, so as to form interstitial spaces therebetween the proppant particulates coated with the second one-step furan resin composition in the at least one fracture, and
wherein the step of introducing the treatment fluid further comprises causing the second one-step furan resin composition to contact at least a portion of the interstitial spaces,
wherein the step of introducing the overflush fluid further comprises displacing an excess of the second one-step furan resin from the interstitial spaces,
and wherein the step of setting the first and/or second one-step furan resin further comprises forming at least a partially consolidated permeable proppant pack in the at least one fracture.

* * * * *

UNITED STATES PATENT AND TRADEMARK OFFICE
CERTIFICATE OF CORRECTION

| | | |
|---|---|---|
| PATENT NO. | : 9,027,648 B2 | Page 1 of 1 |
| APPLICATION NO. | : 13/845502 | |
| DATED | : May 12, 2015 | |
| INVENTOR(S) | : Sanders et al. | |

It is certified that error appears in the above-identified patent and that said Letters Patent is hereby corrected as shown below:

On the title page item [73], should read Halliburton Energy Services, Inc.

Signed and Sealed this
Twenty-second Day of September, 2015

Michelle K. Lee
*Director of the United States Patent and Trademark Office*